United States Patent

[11] 3,625,576

| [72] | Inventors | Kenneth H. Miller<br>Syracuse, N.Y.;<br>Robert N. Zuck, Glendora, Calif. |
|---|---|---|
| [21] | Appl. No. | 28,899 |
| [22] | Filed | Apr. 15, 1970 |
| [45] | Patented | Dec. 7, 1971 |
| [73] | Assignee | Carrier Corporation<br>Syracuse, N.Y. |

[54] BEARING AND SEALING STRUCTURE FOR HIGH-SPEED SHAFTS
2 Claims, 2 Drawing Figs.

[52] U.S. Cl. .................................................. 308/9,
308/36.1, 308/160, 308/170
[51] Int. Cl. .................................................. F16c 17/10,
F16c 33/72
[50] Field of Search .................................................. 308/78,
160, 122, 168, 170, 36.1, 161, 163, 9

[56] References Cited
UNITED STATES PATENTS

| 2,362,667 | 11/1944 | Schmidt ....................... | 308/168 X |
| 2,953,416 | 9/1960 | Collins et al. ................. | 308/168 X |
| 3,328,094 | 6/1967 | Muijderman ................. | 308/160 X |
| 2,570,682 | 10/1951 | Imbert ........................ | 308/160 X |

Primary Examiner—Martin P. Schwadron
Assistant Examiner—Barry Grossman
Attorneys—Harry G. Martin, Jr. and J. Raymond Curtin ABSTRACT: A bearing in which the shaft is journaled is fixed in a housing and has a radial portion formed with a series of radially disposed grooves extending outwardly from the shaft and terminating short of the periphery of the radial portion. The radial portion of the bearing is formed with a passage extending from the outer end of each groove to an oil drain chamber. A thrust disc or collar is fixed to the shaft and has running engagement with the surface of the radial portion of the bearing and has a cylindrical flange encircling the same. A seal is provided intermediate the housing and the flange to prevent or reduce to a minimum the escape of oil from within the housing.

PATENTED DEC 7 1971　　3,625,576

INVENTOR.
ROBERT N. ZUCK
BY KENNETH H. MILLER

D. Emmett Thompson
ATTORNEY.

BEARING AND SEALING STRUCTURE FOR HIGH-SPEED SHAFTS

BACKGROUND OF THE INVENTION

In certain mechanisms, a shaft journaled in the housing is operated at high speed of several thousand revolutions per minute. A thrust bearing is provided and is supplied with oil in the area of the shaft for outward flow between the engaging members of the thrust bearing. The oil is discharged from the thrust bearing at high velocity; and, conventionally, a seal is provided to prevent or limit the escape of the discharged oil from the housing in which the bearing is mounted. An example of such mechanism is a turbine-operated supercharger used in conjunction with diesel engines. The turbine is operated by exhaust gases from the engine and is mounted in a chamber exteriorly of the housing. Accordingly, it is desirable to prevent or substantially reduce the escape of oil from the housing from both the standpoints of conserving the oil supply and preventing the oil from entering the exhaust gasflow.

This invention has an object a bearing and sealing structure for use in an environment such as referred to and embodying a structural arrangement which is effective to prevent or substantially reduce the escape of oil from the housing.

SUMMARY OF THE INVENTION

A combination journal and thrust bearing member is fixedly mounted in the housing. The radial surface of the thrust portion of the bearing is formed with grooves extending outwardly from the shaft. The outer ends of the grooves communicate with a passage leading to an oil drain chamber. Oil is supplied under relatively high pressure to the journal portion of the bearing for flow into the grooves of the thrust portion. The thrust disc or collar fixed to the shaft and rotatably engaging the thrust bearing is provided with a cylindrical flange encircling the thrust bearing to prevent the radial discharge of any oil not directed through the passages to the drain chamber. The collar flange is encircled by a sealing member.

DESCRIPTION OF THE PREFERRED EMBODIMENT

Figure 1:
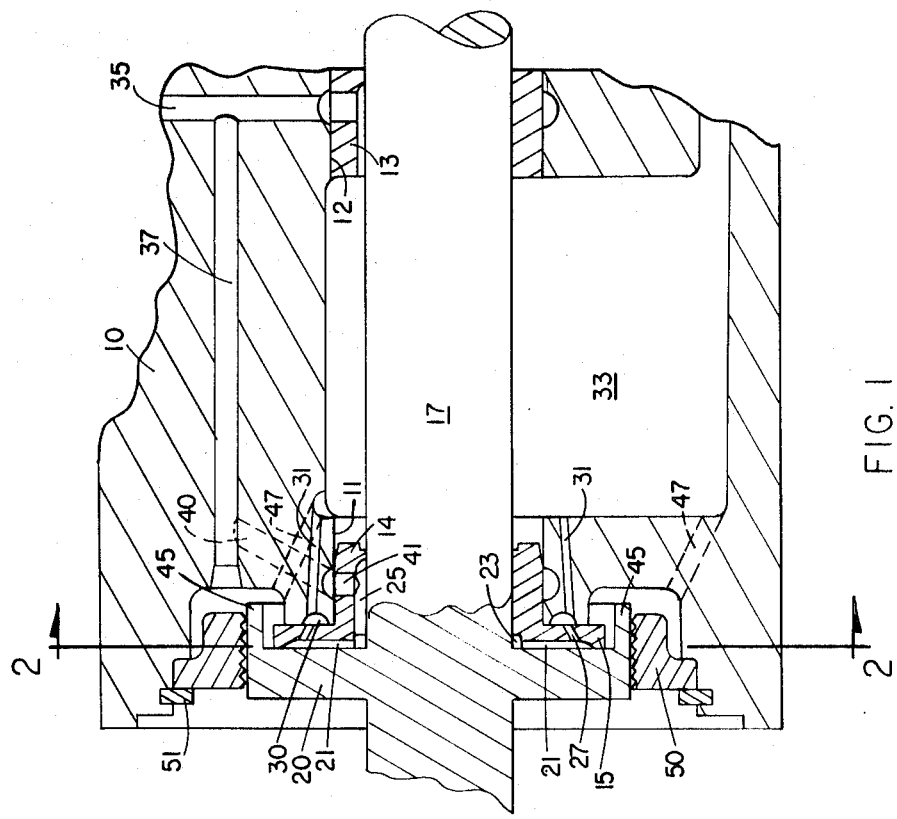
FIG. 1 is a lengthwise sectional view of a bearing structure embodying our invention.
Figure 2:
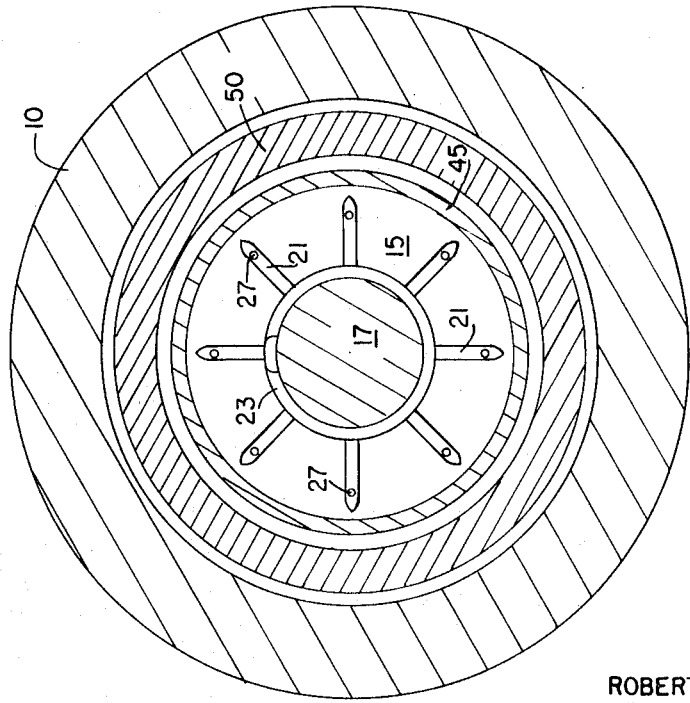
FIG. 2 is a view taken on line 2—2 of FIG. 1.

Referring to FIG. 1, the housing 10 is formed with axially spaced bores 11, 12. A journal bearing 13 is mounted in the bore 12. A bearing is mounted in the bore 11 and is formed with a journal portion 14 and a thrust portion 15. The shaft 17 is journaled in the bearings 13, 14 and is formed or provided with a thrust disc or collar 20 for running engagement with the face of the thrust portion 15.

The thrust portion 15 is formed with a circular series of radially extending grooves 21 which extend outwardly from a circular groove 23 having communication with an axially extending groove 25 formed in the bore of the journal portion 14. The grooves 21 terminate a short distance inwardly from the periphery of the thrust portion 15, which is formed with a passage 27 communicating with each of the grooves 21 adjacent the outer end thereof. The passages 27 incline toward the axis of shaft 17 and extend to a circular groove 30 formed in housing 10 and which is connected to passage 31 discharging into an oil drain chamber 33 formed intermediate the bearings 13, 14.

Oil under pressure is supplied through line 35 to the bearing 14 and through a branch line 37 to a passageway 40 connecting with the groove 25 through a hole 41 formed in bearing 14. This arrangement provides oil for lubricating the journal bearings 13, 14 and supplying oil from the annular groove 23 to the grooves 21. The oil moves outwardly through the grooves 21 to the passages 27 and through passage 31 to the oil drain chamber 33. With this arrangement, an abundant supply of lubrication is provided between the thrust portion 15 of the bearing and the rotating collar 20. The major portion of this oil flow is redirected through the passages 27, 31 to the oil drain chamber 33.

The collar 20 is formed with a cylindrical flange 45 encircling the periphery of the thrust portion 15 of the bearing. The flange 45 serves to control the radial discharge of any oil from between the collar 20 and the thrust bearing portion 15. Any such discharge that may take place is conveyed by a passage 47 to the oil drain chamber.

A labyrinth-type seal 50 is interposed between the periphery of the disc 20 and the flange portion 45 thereof and the housing 10. This seal serves to prevent or reduce to a minimum the outward passage of any oil that may condense on the flange 45 from oil vapor produced by the operation of the device. The seal 50 is retained in the housing by a retaining ring 51.

It will be apparent that the bearing and sealing structure of our invention, while providing adequate lubrication between the shaft thrust collar 20 and the thrust bearing 15, also prevents or substantially limits the escape of any oil outwardly from the housing.

We claim:

1. A bearing and sealing structure for use in conjunction with a high-speed rotating shaft comprising a housing, a bearing member mounted in said housing and including a journal portion and a radially disposed thrust portion, a shaft journaled for rotation in said journal portion, a collar fixed to said shaft for rotation therewith and being disposed in confronting relation with said thrust portion for engagement therewith to limit axial thrust movement of said shaft, the side surface of said thrust portion engaged by said collar being formed with a plurality of grooves extending outwardly from said shaft and terminating in spaced adjacency to the periphery of said portion, means operable for supplying oil under pressure to said journal portion of the bearing for transfer to the inner ends of said grooves, a passage formed in said thrust portion and extending from the outer end of each of said grooves in a direction away from said collar and serving to convey oil from said grooves to an oil drain chamber formed in said housing, said collar being provided with a cylindrical flange encircling said thrust portion of said bearing, and a seal member interposed between said cylindrical flange and said housing.

2. A bearing structure as set forth in claim 1 wherein said passages incline from grooves in a direction toward the axis of said shaft.

* * * * *